3,173,848
PRODUCTION OF 5 - AMINO - 4 - IMIDAZOLE-
CARBOXAMIDE RIBOSIDE AND RELATED
COMPOUNDS
John R. De Zeeuw, Mystic, Conn., assignor to Chas.
Pfizer & Co., Inc., New York, N.Y., a corporation of
Delaware
No Drawing. Filed Nov. 5, 1963, Ser. No. 321,438
5 Claims. (Cl. 195—28)

The present invention relates to a method for the production of 5-amino-4-imidazolecarboxamide riboside and certain derivatives thereof. More particularly, it relates to the biochemical production of 5-amino-4-imidazolecarboxamide riboside and its ribotide, 5-amino-4-imidazolecarboxamide riboside-5'-phosphoric acid, which is suitable for large scale commercial use.

5-amino-4-imidazolecarboxamide riboside serves as intermediate for the enzymatic preparation of the ribotide (Greenberg, J. Biol. Chem., 219, 423) which in turn serves as precursor for the synthesis, by known methods, of inosinic acid, a flavor enhancer.

The accumulation of 5-amino-4-imidazolecarboxamide riboside by *Bacillus subtilis* (Shiro et al., Agr. Biol. Chem., 26, 785–6, 1962) and by *Escherichia coli* (Gots et al., J. Biol. Chem., 210, 395–405, 1954; Greenberg, J. Am. Chem. Soc., 74, 6307–8, 1952) has been demonstrated. (The trivial names employed by Potter, "Nucleic Acid Outlines," vol. I, Burgess Publ. Co., Minneapolis, Minn., 1960, p. 145, are used throughout the specification.)

It has now been found that 5-amino-4-imidazolecarboxamide riboside accumulates in high concentrations in the growing culture filtrate of *Arthrobacter albidus* sp. nov., ATCC 15243, which requires biotin and hypoxanthine or mixtures of adenine and guanine or adenine and xanthine as growth factor. By the process of the present invention, an efficient, economical and commercially feasible route to 5-amino-4-imidazolecarboxamide riboside is provided. Additionally, 5-amino-4-imidazolecarboxamide ribotide is also found to accumulate although in lesser quantities than the riboside.

This valuable organism is identified in the culture collection of Chas. Pfizer & Co., Inc., as culture 2–018. A type culture has been deposited with the American Type Culture Collection in Washington, D.C., and added to their permanent collection under the number ATCC 15243.

The culture was identified by Dr. John B. Routien who provided the following description.

This culture was planted on the media frequently used for the identification of Eubacteria. The methods were those outlined in Manual of Microbiological Methods by the Society of American Bacteriologists, 1957. Exceptions to these methods are noted. The temperature of incubation was 28° C. except where otherwise noted. Readings were made at frequent intervals up to one week for most tests but up to two weeks for acid production from carbohydrates.

The culture is deficient for biotin and hypoxanthine, so these were added at the rate of 100 mcg./l. and 100 mg./l., respectively to all media. Suitable controls with these compounds as the sole carbon source were used where needed.

An old slant was used to seed a flask of medium of the following composition: nutrient broth 5 g.; yeast extract 7 g.; glucose 10 g.; biotin and hypoxanthine as described; deionized water to make 1 liter; pH adjusted to 7.2; dispensed in 300 ml. flasks at the rate of 75 ml./flask and autoclaved at 121° C. for 15 minutes. The culture was incubated 24 hours at 28° C., and then 1 ml. was added to another flask of the same medium which was incubated under the same conditions.

A slide was made at the start of the experiment and at hourly intervals for 24 hours. These were fixed and Gram-stained. At daily intervals a slide was prepared from the original flask that had continued incubation.

A study of these slides showed that at the start the cells were Gram positive rods, single or in pairs or clusters, 1.3–2.0 x 0.7μ. After 5 hours about 80% of the cells measured 2.5–4.0 x 0.7–1.0μ. Division of many of these had occurred, and in some cases separation of the daughter cells had occurred. Mostly there were only 2 cells in a chain, but sometimes there were 3 or 4. V-forms and palisade arrangements were seen.

In succeeding hours these daughter cells enlarged and repeated the process described above but did not become as large as earlier. This caused later generations of cells to be shorter and nearly coccoid in shape, and finally the cells were the same size as those at the start. By the 18th hour some of the cells were Gram negative with Gram positive centers. After 2 or 3 days the cells had less of the crystal violet color and were more reddish in color but did not become Gram negative.

This agrees with the events described by Mulder et al. (Ann. Inst. Pasteur, 105, 45–53, 1963) and by Veldkamp et al. (Antonie van Leeuwenhoek, Journal of Microbiology and Serology, 29(1), 35–51, 1963) for a culture they called *A. globiformis*, but it seems not to agree with the events described by Stevenson (Canadian Journal of Microbiology, 7, 569–575, 1961) for this same species.

A study was made of the manner of formation of the V-shaped pairs. The culture was streaked on a plate of nutrient agar and incubated at 28° C. When the cultures were about 16 hours old the cells were examined in situ by oil immersion lens. Sudden shifts in position of the cells indicated the likelihood of snapping post-fission movement. A single long rod that showed a line of fission was watched steadily until suddenly, in a fraction of a second, the two daughter cells broke almost completely apart in a vigorous movement and came to lie in a V-form. This happened just as described by Starr and Kuhn (Achiv. für Mikrobiologie, 42, 289–298, 1962).

The slides from the shake flasks were examined for the formation of V-figures by either of the other two methods described by Starr and Kuhn. Numerous figures resembling the V-forms produced by germination of the adjacent cocci described by them in their figure 5b were seen, but there was no angular growth or "budding" of rods.

It is concluded that culture 2–018 produces V formation by snapping post-fission movement and probably also by germination of adjacent cocci.

The culture was determined, on the basis of its morphology and life cycle, to be a species of Arthrobacter as described in "Bergey's Manual of Determinative Bacteriology," 7th edition, The Williams & Wilkins Company, Baltimore, Maryland, 1957. Its various properties did not agree with any species of this genus or of Corynebacterium or Brevibacterium or Microbacterium.

Because of these facts culture 2-018 is considered to represent a new species for which the name *Arthrobacter albidus* is proposed. The type culture is deposited at the American Type Culture Collection as culture ATCC 15243.

The description of this culture follows:

*Arthrobacter albidus* sp. nov.—Rods of varying sizes and shapes: A 24 hour culture on nutrient agar showed cells varying from coccoid to definite rods, varying from 0.7–3.5 x 0.7–1.5$\mu$ but mostly 1.5 x 0.7$\mu$; somewhat pleomorphic; single, in pairs, V-forms and palisade arrangement; snapping division; life-cycle by successive division shows long rods that finally give rise to short rods or coccoid cells; no spores; bipolar staining by Albert's method; Gram positive.

Motility: Lacking.
Gelatin streak: No liquefaction.
Agar colonies: Circular, smooth, shiny, moist, edge entire, colony slightly raised, whitish, opaque.
Agar slant: Moderate growth, filiform, shiny, whitish, butyrous.
Broth: Membranous film, slightly turbid, slight sediment.
Milk: No coagulation; no hydrolysis; pH shanged from 6.5 to 8.2.
Casein hydrolysis: Negative.
Indole: Negative.
Hydrogen sulfide: Not produced in Kligler iron agar.
Methyl red: Positive.
Acetylmethylcarbinol: Negative.
Starch hydrolysis: Negative.
Nitrites from nitrates: Positive.
Catalase: Positive.
Urease (the method of V. B. D. Skerman, "A Guide to the Identification of Bacteria," The Williams & Wilkins Company, Baltimore, Maryland, 1959): Positive.
Hucker's medium: Did not use ammonium as a nitrogen source.
Citrate utilization: Negative.
Cellulose: Negative.
Aerobic.
Temperature relations: 21–37° C.: 37° optimum.
pH range: Growth at pH 6–9; optimum 7–9.
Ammonia from peptone: Positive.
Production of acid from carbohydrates (using 2% peptone plus 1% carbohydrates): Acid but no gas from glucose, fructose (beginning to change to alkaline in 14 days), mannose (acid at 3 and 7 days but no acid by 14 days), sucrose (acid but becoming more alkaline after 14 days), maltose, trehalose (becoming slightly acidic only after 14 days), salicin, aesculine, inositol (weakly acidic after 3 days but further determinations impossible because of production of a dark brown soluble pigment), xylose and mannitol (at first acidic but weaker at 7 days). No acid produced in dextrin, arabinose, rhamnose, melezitose, soluble starch, inulin, galactose, lactose, melibiose, cellobiose, raffinose, glycogen, glycerol, erythritol, adonitol, sorbitol, dulcitol, and $\alpha$-methylglycoside.

Fermentation by method of Hugh and Leifson (Bact. 66, 24–26, 1953) but with medium used by Okumura et al. (J. Agric. Chem. Soc. Japan 36, 141–159, 1962): fermentation (anaerogenic) (acid but no gas in both open and closed tubes of glucose and lactose).

In its broader aspects the process of the present invention comprises fermenting *Arthrobacter albidus*, a hypoxanthine auxotroph, under submerged aerobic conditions. It is to be understood that for the production of 5-amino-4-imidazolecarboxamide riboside and ribotide according to the present invention, limitation to the aforesaid organism is not intended. It is especially desired and intended to include mutants produced from this strain of this organism by various means such as irradiation with X-rays or ultraviolet light, treatment with nitrogen mustards, single cell culture techniques, and the like.

It is also intended to include any organism, regardless of its appearance or physiological behavior, that may be developed by means of transformation, transduction, conjugation or some other genetical procedure, using a nucleic acid or an equivalent material from the herein described species, whereby it has acquired the ability to produce the elaboration products herein described or to carry on the biochemical changes herein described.

In conducting the present process, the microorganism may be maintained on nutrient agar slants or on other suitable media known to skilled bacteriologists. An especially effective slant medium is one containing 30.0 g./l. of Bacto-peptone, 3.0 g./l. of Bacto-meat extract, 5.0 g./l. of Bacto-yeast extract, 5.0 g./l. of glucose, 20.0 g./l. of agar and tap water to volume. The make-up pH is 6.9 and requires no adjustment prior to sterilization by autoclaving at 121° C. for 15 minutes. Inoculated slants are incubated overnight at 28° C. and stored under refrigeration. The cell growth may be transferred from such slants to suitable nutrient media for growth of the organism in flasks. A suitable period of growth in flasks is from about 24 to about 90 hours. The material thus produced may be used for the recovery of the product or for inoculation of media contained in larger vessels equipped for submerged aerobic fermentation. These may be used for producing larger quantities of product.

The media used for conducting the present fermentaton process may be varied. The process is operated at a pH of from about 5.5 to 8.5. A medium composed basically of a source of nitrogen, of a carbohydrate, of phosphate and of minerals is required. As phosphate source, any water soluble phosphate such as diammonium hydrogen phosphate, potassium dihydrogen phosphate, dipotassium hydrogen phosphate and the corresponding sodium salts can be used. Satisfactory nitrogen sources include myriad proteinaceous materials such as hydrolyzed casein of various types, hydrolyzed soybean meal, distiller's solubles, corn steep, etc. Suitable carbohydrate sources are sucrose, fructose, mannose, maltose, glucose, xylose, etc. The preceding materials frequently contain sufficient minerals to satisfy the mineral requirements of the organism without the addition of substantial additional mineral components. It has been noted that the addition of glucose as carbohydrate source either continuously or intermittently throughout the fermentation is particularly effective in stimulating the production of high yield of 5-amino-4-imidazolecarboxamide riboside.

After the fermentation medium is prepared it may be adjusted to a pH of from approximately 5.5 to about 8.5 as indicated above. The adjustment may be made with alkali such as sodium or potassium hydroxide or carbonates, if the mixture is acid. If materials are used as nutrients in the fermentation medium which tend to change the pH, it may be necessary to use buffering materials or adjust the pH during the fermentation. Thereafter the medium is sterilized and inoculated under sterile conditions with a selected strain of *Arthrobacter albidus*.

The fermentation is usually conducted at a temperature of about 28° C., although this temperature may be varied somewhat from about 25° to 34° C., for a period of from 30 to 96 hours after the broth has been incubated with the organism. Fermentation is conducted under submerged, aerobic conditions. Efficient aeration is essential to the fermentation process. For this purpose, vigorous agitation is employed to ensure thorough distribution of the air throughout the fermentation medium. For example, aeration is carried out at a rate of from about one quarter to about two volumes of air per volume of reaction mixture per minute. Additional agitation as, for example, by stirring is desirable. At the end of this time, the fermentation broth is rich in 5-amino-4-imidazolecarboxamide riboside and ribotide. Periodically, samples of the reaction mixture are assayed for 5-amino-4-imidazolecarboxamide riboside and ribotide concentration by the Bratton and Marshall method for non-acetylatable diazotizable amines (J. Biol. Chem., 128, 537) as modified by Ravel et al. (J. Biol. Chem., 172, 67). This procedure may be employed to follow the course of the reaction. Paper chromatography may be used to obtain a more quantitative value of the riboside or ribotide concentration since the Bratton and Marshall method detects not only the riboside but all diazotizable amines present. Suitable solvent systems are 80% n-propanol in water (v./v.) and n-butanol:acetic acid:water in the proportion of 4:1:5.

The hypoxanthine levels operative in this process can be varied within rather wide limits. The initial concentration in the fermentation is of critical importance and should be within the range of about 50 to about 200 mg. per liter. In general, the best results are obtained when the hypoxanthine levels are in the range of about 80 to 100 mg. per liter. Alternatively, the hypoxanthine can be replaced by an equal weight of mixtures of adenine plus guanine or of adenine plus xanthine in which the components are present in approximately equal amounts by weight. In actual practice mixtures comprising from about 70% adenine to about 30% guanine or xanthine, or from about 30% adenine to about 70% guanine or xanthine are operative.

The 5 - amino - 4 - imidazolecarboxamide riboside and ribotide may then be recovered from the fermentation medium by a variety of methods known in the art. Greenberg (op. cit.) reports a procedure for the isolation of the riboside on a small scale. A procedure adaptable to the recovery on a larger scale is described by Stetten et al., J. Biol. Chem., 161, 333 (1945). This method comprises the precipitation of all amino compounds by mercuric acetate at pH 7 to 7.5. Following decomposition of the mercuric salts by hydrogen sulfide the aqueous solution of amino compounds is extracted with peroxide-free ether, concentrated to small volume in a nitrogen atmosphere and made alkaline to remove volatile bases. The mercuric salt precipitation and decomposition is repeated and the remaining aqueous solution evaporated in vacuo to near dryness. The residue is extracted with ethanol, taken up in water and treated with ethanolic picric acid to give the picrate as yellow needles. The free riboside is isolated by ether extraction of an aqueous sulfuric acid suspension of the picrate followed by removal of the sulfate with barium hydroxide and barium carbonate. Evaporation of the filtrate to near dryness gives the riboside which is recrystallized from water.

A more convenient method for large scale recovery is that of Greenberg et al., J. Biol. Chem., 219, 411–22 (1956), which comprises adsorption of all amino compounds on Norit A. The Norit A is collected, air-dried on a Buchner funnel and the filter cake eluted with ten times its weight of ethanol:concentrated ammonium hydroxide:water (5:3:2). The eluate is concentrated in vacuo to an oil, water added and the pH brought to 10–11 by ammonium hydroxide. The alkaline solution is then percolated through a Dowex 1 formate column. The riboside is washed through with water and obtained as an oil by freeze-drying. The oil is taken up in 0.01 N hydrochloric acid, adsorbed on Dowex-50, ammonium form (a strongly acid cation exchange resin, a copolymer of styrene cross-linked with a divinyl aromatic compound, containing sulfonic acid groups; available from the Dow Chemical Co.) and eluted with 0.1 N ammonium hydroxide. The eluate is taken to dryness and the residue recrystallized from water. The ribotide is obtained by eluting the Dowex 1 column with a large volume of 0.2 N ammonium formate at pH 4.18.

Also produced by this fermentation process are 5-amino-4-imidazole-N-succino-carboxamide riboside and 5-amino - 4 - imidazolecarboxylic acid riboside. These materials are produced in lower amounts than is the 5-amino-4-imidazolecarboxamide riboside and are conveniently separated by paper chromatography.

The following examples are given by way of illustration and are not to be construed as limitations of this invention, many variations of which are possible within the scope and spirit thereof.

EXAMPLE I

A nutrient medium having the following composition is prepared, adjusted to pH 6.5 and sterilized at 121° C. for 15 minutes.

| | |
|---|---|
| D-glucose [1] _____grams/liter__ | 50.0 |
| Urea _____do____ | 8.0 |
| Ammonium chloride _____do____ | 5.0 |
| Vitamin-free casamino acids (Norit treated acid hydrolyzed casein) _____grams/liter__ | 5.0 |
| Potassium dihydrogen phosphate _____do____ | 1.0 |
| Magnesium chloride hexahydrate _____do____ | 0.25 |
| Ferric chloride hexahydrate _____do____ | 0.01 |
| Manganese sulfate monohydrate _____do____ | 0.01 |
| D-calcium pantothenate _____do____ | 0.001 |
| Thiamine nitrate _____do____ | 0.002 |
| D-biotin _____mcg./l.__ | 100 |
| Calcium carbonate [1] _____grams/liter__ | 10.0 |
| Hypoxanthine _____do____ | 0.100 |
| Distilled water to 80% volume.[1] | |

[1] The ingredients are made up to 80% volume and added to each flask. The D-glucose and calcium carbonate are sterilized separately as 100 g./200 ml. and 20 g./200 ml. water, respectively and added to each flask to bring to proper volume and composition.

Inoculum is prepared by transferring the growth from slants of *Arthrobacter albidus* sp. nov. ATCC 15243 to 25 x 150 mm. tubes containing 10 ml. of the following medium:

| | Grams/liter |
|---|---|
| Bacto-peptone _____ | 30.0 |
| Bacto-meat extract _____ | 3.0 |
| Bacto-yeast extract _____ | 5.0 |
| D-glucose _____ | 5.0 |
| Tap water to volume. | |

The inoculated tubes are incubated at 28° C. for 20 hours on a New Brunswick gyrotary shaker (200 r.p.m., 1″ stroke) on which the tube rack is inclined 30° C.

The main batch of medium is then dispensed to 300 ml. Erlenmeyer flasks, 20 ml. per flask. Each flask is inoculated with 0.5 ml. 20 hour broth from above and run for 72 hours.

Paper chromatography of clarified broth, coupled with the Bratton-Marshall test, shows 2.0 g./l. of the riboside to be present.

EXAMPLE II

The fermentation process of Example I is repeated in ten 4 liter pots, each containing 2 liters of nutrient medium, but using the following fermentation medium adjusted to pH 6.6 before sterilizing:

| | |
|---|---|
| D-biotin _____mcg./l.__ | 30 |
| Urea _____do____ | 8.0 |
| Ammonium chloride _____do____ | 5.0 |
| Dipotassium hydrogen phosphate _____do____ | 1.0 |
| Manganese chloride monohydrate _____do____ | 0.01 |
| Magnesium sulfate heptahydrate _____do____ | 0.5 |
| Ferric chloride hexahydrate _____do____ | 0.01 |
| D-Biotin _____mcg./l.__ | 30 |
| Hypoxanthine _____ See table below |
| Calcium carbonate [1] _____grams/liter__ | 10.0 |
| Distilled water to 90% volume. | |

[1] The D-glucose and calcium carbonate are sterilized separately and added to the pots containing all other ingredients after autoclaving.

The hypoxanthine content of the pots is varied according to the schedule:

| Pot No. | AICAR (mg./ml.) |
|---|---|
| 1, 2 | 60 |
| 3, 4 | 80 |
| 5, 6 | 100 |
| 7, 8 | 120 |
| 9, 10 | 150 |

Incubation is conducted at 28° C. for 46 hours after which the broths are quantitatively assayed (Bratton- Marshall) for 5-amino-4-imidazolecarboxamide riboside (AICAR):

| Pot Nos. | AICAR (Mg./ml.) |
|---|---|
| 1 | 0.64 |
| 2 | 0.65 |
| 3 | 0.72 |
| 4 | 0.65 |
| 5 | 0.65 |
| 6 | 0.70 |
| 7 | 0.58 |
| 8 | 0.55 |
| 9 | 0.62 |
| 10 | 0.60 |

This experiment shows the hypoxanthine levels of from about 80 to about 100 mg./l. to be most favorable for the accumulation of the riboside.

EXAMPLE III

The procedure of Example II is repeated using 80 mg./l. of hypoxanthine and varying amounts of glucose (Cerelose). The fermentation is conducted in 4 liter pots at 28° C. for 72 hours using air at 1 v./v./min., the glucose being added separately according to the following schedule. Pots numbers 1, 5, 9 and 13 are made up to 1.8 liters at the start of the fermentation. The remaining pots are made up to 1.6 liters.

Glucose (Cerelose) additions per pot at:

| Pot No. | 0 hours | 24 hours | 48 hours |
|---|---|---|---|
| 1, 9 | 100 g. in 200 ml | | |
| 2, 10 | 100 g. in 200 ml | 100 g. in 200 ml | |
| 3, 11 | 100 g. in 200 ml | 50 g. in 100 ml | 50 g. in 100 ml. |
| 4, 12 | 50 g. in 200 ml | 50 g. in 100 ml | 50 g. in 100 ml. |
| 5, 13 | 100 g. in 200 ml | | |
| 6, 14 | 100 g. in 200 ml | 100 g. in 200 ml | |
| 7, 15 | 100 g. in 200 ml | 50 g. in 100 ml | 50 g. in 100 ml. |
| 8, 16 | 50 g. in 200 ml | 50 g. in 100 ml | 50 g. in 100 ml. |

Quantitative assay of the broths at the end of 24, 48 and 72 hours gives the following yields of 5-amino-4-imidazolecarboxamide riboside (AICAR).

AICAR (mg./ml.)

| Pot No. | 24 hours | 48 hours | 72 hours |
|---|---|---|---|
| 1 | 0.16 | 0.82 | 0.89 |
| 2 | 0.16 | 1.12 | 1.60 |
| 3 | 0.15 | 1.31 | 1.98 |
| 4 | 0.11 | 0.94 | 1.41 |
| 5 | 0.095 | 0.63 | 0.78 |
| 6 | 0.11 | 0.66 | 1.43 |
| 7 | 0.11 | 0.68 | 1.51 |
| 8 | 0.078 | 0.70 | 1.57 |
| 9 | 0.16 | 0.70 | 0.82 |
| 10 | 0.15 | 1.06 | 1.48 |
| 11 | 0.14 | 1.17 | 1.86 |
| 12 | 0.10 | 1.02 | 1.51 |
| 13 | 0.13 | 0.70 | 0.82 |
| 14 | 0.11 | 0.60 | 1.39 |
| 15 | 0.13 | 0.74 | 1.62 |
| 16 | 0.067 | 0.71 | 1.44 |

Yields approaching 2 gms./liter are thus obtained by supplementing the amount of glucose present at a given time during the fermentation.

EXAMPLE IV

*Isolation of 5-amino-4-imidazolecarboxamide riboside*

Following the procedure of Example II, 6 pots (2 liters/4 liter pot) are fermented for 46 hours, after which their contents are combined, adjusted to pH 2.0 with hydrochloric acid, then centrifuged. The supernatant, about 12 l. of clear solution, is then worked up according to the procedure of Greenberg et al., J. Biol. Chem., 219, 411–22 (1956) to give the riboside.

EXAMPLE V

The procedure of Example I is repeated but using a nutrient medium having the following composition. The complete medium, including D-glucoe and calcium carbonate, is prepared and sterilized at one time rather than separately as in Example I.

| | | |
|---|---|---|
| D-glucose | grams/liter | 75.0 |
| Urea | do | 12.0 |
| Diammonium hydrogen phosphate | do | 8.0 |
| Sodium citrate dihydrate | do | 0.5 |
| Sodium chloride | do | 1.0 |
| Magnesium sulfate heptahydrate | do | 0.5 |
| Manganese sulfate monohydrate | do | 0.01 |
| Ferrous sulfate heptahydrate | do | 0.01 |
| D-biotin | mcg./l. | 100 |
| Thiamine | grams/liter | 0.002 |
| Hypoxanthine | do | 0.100 |
| Calcium carbonate | do | 30.0 |

Paper chromatography of the clarified broth coupled with the Bratton-Marshall test shows 200 mg./l. of the ribotide to be present. The riboside is also found to be present although no quantitative determination of its concentration was made.

The ribotide is recovered by the procedure of Example IV, the ribotide being eluted from the Dowex-1, formate cycle, column with 0.2 N ammonium formate at pH 4.18. Evaporation of the eluate to dryness under reduced pressure gives the ribotide.

EXAMPLE VI

The procedure of Example I is repeated but using the following growth factors in place of hypoxanthine:

| Growth factor— | Level (mg./liter) |
|---|---|
| Adenine+guanine (50–50) | 100 |
| Adenine+guanine (70–30) | 100 |
| Adenine+guanine (30–70) | 100 |
| Adenine+guanine (50–50) | 80 |
| Adenine+xanthine (70–30) | 100 |
| Adenine+xanthine (30–70) | 100 |
| Adenine+xanthine (50–50) | 100 |
| Adenine+guanine (10–90) | 80 |

In each instance the results obtained are similar to those of Example I.

What is claimed is:

1. A process for the preparation of a compound selected from the group consisting of 5-amino-4-imidazolecarboxamide riboside and 5-amino-4-imidazolecarboxamide riboside-5'-phosphoric acid which comprises cultivating under aerobic conditions in an aqueous nutrient fermentation medium containing a source of available nitrogen, a source of carbohdyrate and at least about 50 mg./liter of a growth factor selected from the group consisting of (*a*) hypoxanthine, (*b*) adenine and guanine, and (*c*) adenine and xanthine, a nutritionally deficient species of *Arthrobacter albidus* ATCC 15243, which species requires for its growth biotin and one of said growth factors, maintaining the pH of the culture medium within the range of from about 5.5 to 8.5 until a substantial amount of a compound selected from the group consisting of 5-amino-4-imidazole-carboxamide-riboside and 5-amino-4-imidazolecarboxamide-riboside-5'-phosphoric acid is accumulated in said medium.

2. A process as claimed in claim 1 wherein a compound selected from the group consisting of 5-amino-4-imidazole-carboxamide riboside and 5-amino-4-imidazolecarboxamide riboside-5'-phosphoric acid is recovered from the medium.

3. A process as claimed in claim 1 wherein a glucose source is added to the nutrient medium after initiation of the fermenation.

4. A process according to claim 1 wherein the growth factor is initially present at a level of from about 50 to about 200 mg./liter.

5. A process according to claim 4 wherein the growth factor is hypoxanthine.

No references cited.

A. LOUIS MONACELL, *Primary Examiner.*

UNITED STATES PATENT OFFICE
CERTIFICATE OF CORRECTION

Patent No. 3,173,848   March 16, 1965

John R. De Zeeuw

It is hereby certified that error appears in the above numbered patent requiring correction and that the said Letters Patent should read as corrected below.

Column 6, line 51, for "D-biotin---------mcg./1--30" read -- D-glucose¹----------grams/liter----50.0 --; line 67, for "AICAR" read -- Hypoxanthine --.

Signed and sealed this 24th day of August 1965.

(SEAL)
Attest:

ERNEST W. SWIDER
Attesting Officer

EDWARD J. BRENNER
Commissioner of Patents